United States Patent [19]

Knuth

[11] 4,048,657
[45] Sept. 13, 1977

[54] METHOD AND APPARATUS FOR SYNCHRONIZING A FACSIMILE TRANSMISSION

[75] Inventor: Kurt E. Knuth, Mount Prospect, Ill.

[73] Assignee: Teletype Corporation, Skokie, Ill.

[21] Appl. No.: 642,854

[22] Filed: Dec. 22, 1975

[51] Int. Cl.² ............ H04N 1/04; H04N 1/06; H04N 1/36
[52] U.S. Cl. ............ 358/285; 358/293; 358/263; 358/265
[58] Field of Search ............ 178/69.5 F, 7.6, 7.1, 178/6.6 R, 7.3 R, 7.4, 6.7 R, 6.6 TC, 6; 346/109; 358/263, 264, 285, 293, 256

[56] References Cited

U.S. PATENT DOCUMENTS

| | | | |
|---|---|---|---|
| 2,540,922 | 2/1951 | Wickham | 178/69.5 F |
| 3,313,884 | 4/1967 | Hackenberg et al. | 178/69.5 F |
| 3,461,227 | 8/1969 | Perreault | 178/7.1 |
| 3,566,034 | 2/1971 | Brouwer | 178/69.5 F |
| 3,582,549 | 6/1971 | Hell et al. | 178/69.5 F |
| 3,666,880 | 5/1972 | Krause | 178/6.6 TC |
| 3,715,498 | 2/1973 | Haynes | 178/69.5 F |
| 3,800,080 | 3/1974 | Fuwa | 178/7.1 |
| 3,846,583 | 11/1974 | Boulter | 178/67 |
| 3,902,008 | 8/1975 | Ogawa | 178/6 |
| 3,975,761 | 8/1976 | Taudt et al. | 178/69.5 F |

OTHER PUBLICATIONS

Edwardson, "The Digital Timing-Correction of Video Tape Recorded Colour Television Signals", *Proceedings of the Conference on Video and Data Recording*, Birmingham, England (10-12 July 1973); pp. 27-39.

*Primary Examiner*—John C. Martin
*Attorney, Agent, or Firm*—W. K. Serp; M. Pfeffer

[57] ABSTRACT

A facsimile transmission system is described which includes a transmitter section having an optical sensor driven across a selected document by a variable speed motor controlled by the frequency of an oscillator. The relative movement of the sensor with respect to the document is indicated by a pulse generator which clocks the output of the sensor into a storage memory. The stored data is clocked from the storage memory by the oscillator output and fed, along with the oscillator signal, to a diphase modulator. At a receiver section, the diphase signal is demodulated providing data and clock signals. The data signal is placed into a receiver storage memory. The clock frequency is used to control the speed of a recorder motor driving a recorder. A pulse generator is coupled to the recording device and generates recorder location pulses which are used to clock the data from the memory.

6 Claims, 2 Drawing Figures

METHOD AND APPARATUS FOR SYNCHRONIZING A FACSIMILE TRANSMISSION

BACKGROUND OF THE INVENTION

This invention generally relates to a method and apparatus for synchronizing a facsimile receiver with a facsimile transmitter and more particularly relates to the synchronization of the speed and phase of the document scanning and copy reproduction devices in a facsimile transmission system.

To effect the reproduction of an acceptable copy of the transmitted document, both the transmitter and receiver should be maintained in synchronization. Not only should the document and copy frames be in synchronization, that is, the received copy page should start at the appropriate time, but additionally, throughout transmission, the data samples must be synchronized so that they occur with respect to the copy at locations corresponding to their positions on the transmitted document. A particular system, as described in U.S. Pat. No. 3,670,105 by Houck issued June 13, 1972 and entitled "Phasing System for Facsimile Recorders," provides phase synchronization of the receiver at the start of the transmission; however, such synchronization may be lost during transmission and without corrective steps being taken could result in unacceptable copy. Various systems have been suggested utilizing commercially available power source frequencies as synchronizing signals. The use of such synchronization signals are not acceptable for use in high resolution systems. At remote locations the power source frequencies and phase may vary resulting in cumulative errors. For example, should the transmitting power frequency be greater than the received frequency, a noticeable quantity of information would be lost due to the inability of the receiver to print at the transmitting speed. Additionally, with respect to each high resolution system, phase variations between the frequency of the transmitter power source and the receiver power source, during transmission, could produce visible distortion patterns in the received copy such as "wood graining." It is further desirable that initial and continued synchronization occur in a short time period since facsimile systems frequently use long distance telephone facilities which are costly.

The device hereinafter described provides synchronization between a facsimile transmitter and receiver with respect to both frequency as well as phase throughout the entire transmission. A receiving copy drum is initially synchronized with a transmitter document drum and maintained in synchronization throughout transmission. One illustrated embodiment utilizes synchronous motors at both the transmitting and receiving terminals to drive the document and copy drums. Such motors are particularly adapted for this application since their speed may be controlled or varied by the frequency of the electrical energy applied to them. An alternate embodiment utilizes direct current motors in a frequency controlled phase-lock loop thus providing the desired motor speed and position control. Speed and position synchronization between the transmitting and receiving terminals in accordance with the illustrated embodiments may be conveniently provided by solid state logic devices thus providing relatively economical implementation.

SUMMARY OF THE INVENTION

Described is an apparatus for generating a facsimile signal corresponding to a selected document. A sensor is positioned adjacent to and selectively moved along the document for generating a signal correspondng to the reflective qualities of the document. Means are provided for successively storing a series of the sensor signals and for reading out the stored signals at a predetermined rate. In this manner, variations in the signal rate from the sensor are substantially eliminated, thus producing a constant output rate from the storage means.

A motor is illustrated for positioning the sensor with respect to the document and means are included for generating a signal of a predetermined frequency for driving the motor and controlling the output rate of the storage means. A diphase modulator receives the data output from the memory and the predetermined frequency signal and provides a modulated data signal.

A demodulator is included which extracts both clock and data information from the incoming diphase signal. The data output from the demodulator is stored in a storage means and a signal is generated related to the relative position of a recording device with respect to a copy sheet. This signal serves to control the output rate from the receiver storage means. Embodiments are illustrated utilizing a synchronous as well as direct current motors for driving the document drum and transmitter sensor and the copy drum and receiver recorder.

Described is a method for transmitting a facsimile signal including the steps of generating a signal at a predetermined frequency and positioning a sensor with respect to a document at a rate determined by the predetermined frequency signal. Additionally, a recorder is positioned with respect to a copy sheet at a rate determined by the predetermined frequency signal, and the recorder is driven by the data signal from the document sensor. Further, the method to be described includes the steps of storing the information from the document sensor and modulating the oscillator signal therewith. A demodulator receives the modulated signal and the demodulated data is stored prior to the step of driving the recording device.

Accordingly, it is a main object of this invention to provide a means for synchronizing the operation of a facsimile transmission system. Other objects and advantages of the invention will be more readily appreciated after reference to the following description and accompanying drawings wherein:

DETAILED DESCRIPTION

General

Figure 1:
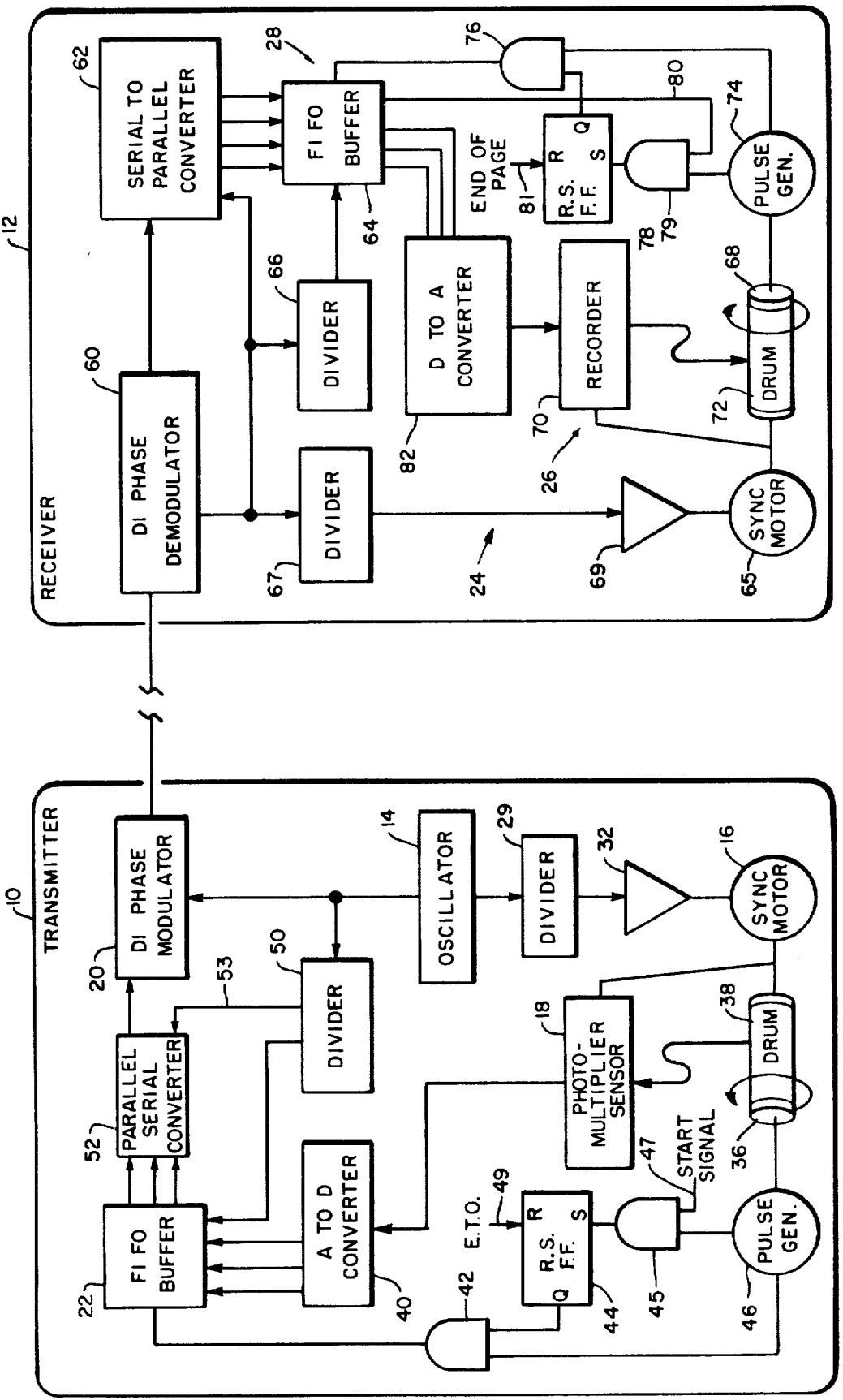
FIG. 1 is a schematic block diagram of a facsimile transmission system including certain features of this invention.

The embodiment illustrated in FIG. 1 includes a transmitter section 10 generating a diphase facsimile signal. The diphase signal carries not only data information, but additionally, timing information. The diphase signal is fed to a receiving section 12 whereat the information is separated into its data and clock components which are utilized to generate a copy of the original document. More particularly, the transmitter section 10 includes an oscillator 14 generating a selected frequency. The oscillator 14 drives a synchronous motor 16 in turn driving an optical sensor in the form of a photomultiplier 18. The analog output of the sensor 18 is converted to a digital signal, buffered and thereafter fed to a diphase modulator 20 as is the oscillator signal. The buffering is accomplished by a first in first out (FIFO) buffer 22 which serves to eliminate any long term cumulative variations between the oscillator 14 frequency fed to the diphase modulator 20 and the output of the sensor 18 as will subsequently be more fully appreciated.

At the receiving terminal 12, the incoming diphase signal is decoded into its component parts and the clocking information is fed to a motor driver unit 24 driving a copy recorder system 26. The data information from the diphase demodulator is fed through a receiving converter-buffer unit 28 and the digital information therefrom is fed to the recorder system 26. The converter-buffer unit 28 serves to maintain synchronization between the copy recorder system 26 and the incoming data derived from the diphase signal.

Transmitter

More particularly, the output of the oscillator 14 of transmitter section 10 is divided to a lower frequency by means of a binary divider 29. The output of the divider 29 is fed through a driving amplifier 32 to the synchronous motor 16. It will be appreciated that a particular characteristic of such a synchronous motor 16 is that its rotational speed is directly related to the frequency of the power source which, in this case, is the oscillator 14. However, in practice, synchronous motors occasionally fail to remain in complete phase synchronism with the driving frequency, a condition commonly known as rotor hunting. It will be appreciated that the mechanical coupling between the motor 16, its sensor 18, and a drum 36 introduces lag or mechanical backlash. Such errors are noncumulative but nevertheless tend to introduce distortion in the transmitted signal. As will be subsequently more fully appreciated, the illustrated apparatus compensates for such variations. The synchronous motor 16 is coupled to the document drum 36 about which a selected document 38 is wrapped. Serving to generate a signal in porportion to the reflective qualities of small discrete sampling areas of the document 38 is the photomultiplier sensor 18. The sensor 18 is physically positioned by the motor 16 and drawn across the document 38 along a predetermined path. It will be appreciated that although the illustrated embodiment utilizes a drum scanner, other forms of document scanning such as, flat bed scanning, may be utilized without departing from the spirit of the invention.

As the drum 36 rotates and the sensor 18 scans across the document 38, the sensor 18 provides a signal output related to the reflectivity of selected areas of the document. The analog output from the sensor 18 is fed to an analog to digital converter 40 which transforms the analog signal into a multilevel binary signal and presents this multilevel binary signal to the inputs of the FIFO buffer 22. Coupled to the synchronous motor is a pulse generator 46 which generates two distinct pulse trains as determined by the rotational speed of the motor. The first pulse train provides a distinct pulse output for each document sample. That is for each discrete document area to be sensed, a sample pulse is generated which is fed to one input of a FIFO control AND-gate 42.

The alternate input of the AND-gate 42 is gated by the direct output of a set-reset flip-flop 44. The set input of the flip-flop 44 is driven by the output of an AND-gate 45. When the top of the document 38 is at a selected position initiating the start of the document 38 scan, a pulse is fed from a pulse generator 46 to one input of the gate 45. The coincidence of the pulse with an operator initiated start of transmission signal via line 48, sets the flip-flop 44. The generating means for the start signal is not shown nor considered part of this invention. The setting of flip-flop 44 places a high signal at the input to and AND-gate 42 allowing the output thereof to follow the document sampling pulses from the generator 46. The flip-flop 44 is reset at the end of the transmission of the document 38 by an end of transmission (EOT) pulse fed via line 49. The output of the AND-gate 42 is fed to the input clock of the FIFO 22. Serving to gate the output of the FIFO is a divider 50, the input of which is fed by the oscillator 14. The modulus of the divider is selected so that the frequency of the FIFO 22 output clocking signal is substantially the same as the input clocking frequency from the generator 46 through the gate 42. In this way, the output data from the FIFO 22 is fed out at approximately the input rate and thus, the FIFO 22 contents are maintained substantially constant over a complete document transmission.

As previously mentioned, due to the possible rotor hunting of motor 36 as well as mechanical backlash, the data may, during short time periods, either exceed or lag the data rate determined by the frequency of the oscillator 14. The FIFO 22 serves to buffer such variations and effectively provides a constant output rate. The multilevel data output of the FIFO 22 is fed to the multilevel inputs of a parallel to series converter 52 which converts the multilevel parallel signal to a serial data stream. Series data is clocked from the converter 52 by a selected output of the divider 50 which provides an output clocking signal at line 53 three times the frequency of the FIFO 22 divider output. It will be appreciated that this frequency ratio is determined by the number of necessary output levels of the FIFO which, in the illustrated embodiment, are three. The output data stream from the converter 52 is fed to the data input of the diphase modulator 20 with the clock input being provided by the output of the oscillator 14. The diphase signal carries both the data information and clocking information and is transmitted to the receiver section 12 via commercial telephone lines, radio or by other suitable means.

Receiver

The incoming diphase signal to the receiver section 12 is fed to a diphase demodulator 60 which separates the data and the clock information. A suitable diphase demodulator for use in the illustrated embodiment is described in U.S. patent application Ser. No. 581,989, filed May 29, 1975, now U.S. Pat. No. 3,982,195, entitled "Method and Apparatus for Decoding Diphase Signals" by Kenneth W. Turner, and having a common assignee with this application. The data signal from the demodulator 60 is fed to the serial input of a serial to parallel converter 62 and clocked therein by means of the clocking signals derived from the incoming diphase signal. The parallel output of the serial to parallel converter 62 is presented to the parallel inputs of a receiving first in first out (FIFO) storage buffer 64. Serving to clock the multilevel data information into the receiving FIFO 64 is the output of a divider 66 clocked by the clock output of the demodulator 60. The divider 66 provides an output at one-third of the input clock frequency. A synchronous motor 65 imparts movement to the copy recorder 26. The motor driver circuit includes a divider 67 receiving the clocking output of the diphase demodulator 60 and in turn feeding a motor amplifier 69. The output of the amplifier 69 drives the synchronous motor 65 which, in turn, is mechanically coupled to a copy drum 68 as well as a copy recorder 70. The recorder 70 is moved along a line parallel to the axis of the drive drum 68 and serves to produce the incoming data information in visual form on a copy paper 72 wrapped about the surface of the drum 68.

Additionally, coupled to the motor 65 is a pulse generator 74 which provides two distinct pulse trains. The first pulse train provides a single pulse for each sample to be recorded on the copy paper 72. This continuous pulse train is fed through one input of an AND-gate 76, the remaining input of which is coupled to the direct output of a set-reset flip-flop 78. The set input of the flip-flop 78 is driven by the output of an AND-gate 79. One input of the gate 75 is fed from the top of page pulse output of the pulse generator 74 and the remaining input to a data available flag via line 80 from the FIFO buffer 64. The reset input to the flip-flop 78 is provided by an end of page signal via line 81. In response to the coincidence of a start of page pulse from the pulse generator 74 and a data available flag for the FIFO 64, the flip-flop 78 is set and the AND-gate 76 feeds the sample pulse train to an output clock of the FIFO. In response to the clocking signals, the FIFO 64 steps the data to a digital to analog converter 82. The output of the converter 82 is fed to the recorder 70 for application to the copy paper 72 wrapped about the drum 68. Thus, as the synchronous motor 34 drives the drum 68, the pulse generator 74 supplies a pulse for each data recording to be placed on the copy paper carried on the drum. The frequency of the output of the AND-gate 76 clocks data from the FIFO 64 at substantially the same frequency as the frequency of the clock signal used to clock data into the FIFO 64. This relation of clocking frequencies serves to prevent the net accumulation of data in the FIFO 64 once recording on the paper 74 has started. In a manner similar to that described in connection with the transmitter FIFO 22, the receiving FIFO 64 serves to "smooth out" short term fluctuations in drum speed and phase variations introduced by noncumulative mechanical backlash and motor 65 hunting.

It is desirable that the incoming data commence recording at the start of the copy page. Since the receiver section 72 is randomly started without regard to the incoming diphase signal; means are included for synchronizing the start of the copy page 72 wrapped about the drum with the start of the signal transmission related to the selected document. To this end, the FIFO 64 capacity is relatively large being at least sufficient to hold the data required for one rotation of the drum. Thus, the drum is capable of rotating a full revolution, until the recorder and start of the paper are in alignment, before the FIFO 64 starts to feed data to the digital to analog converter 82.

Operation

A selected document is wrapped around the transmitter drum 36. The synchronous motor 16 drives the drum 36 at a relatively high speed and the sensor 18 moves along the document. When the sensor 18 reaches the beginning of the document 38, the generator 46, coupled to the drum 36, provides a top of the page pulse which sets the flip-flop 44, opening the AND-gate 42, allowing the multilevel data output of the converter 40 to be clocked into the FIFO 22. Data is clocked from the FIFO 22 by the output of the divider 50 which divides the oscillator frequency to a rate substantially equal to the sample rate from the pulse generator 46. In this way, noncumulative backlash and other mechanical variables tending to produce noncumulative system variations are buffered by the FIFO 22. Should the speed of the drum 36 and thus the frequency of the pulse generator 46 momentarily increase, the FIFO 22 will act to absorb this temporarily increased data rate. Serving to clock the output of the data from the FIFO 22 is the divider 50 output. The data is fed through the analog to digital converter 40 and the serial output therefrom fed to the diphase modulator 20.

The diphase demodulator 60 separates the incoming diphase signal into clock and data information. The data is fed to the converter 62 and clocked therethrough by the clock output from the demodulator 60. The output of the converter is fed into the FIFO 64 and clocked therefrom by the output of the pulse generator 74. The clock output of the demodulator 60 is also fed through the divider 67, amplified and used to drive the synchronous motor 65 which rotates the copy drum 68 about which the copy paper 72 is wrapped. The analog output of the converter 82 is fed to the recorder 70 and as the drum 68 rotates, the output of the converter 82 is recorded upon the copy paper 72. As previously mentioned, the rate of the sample pulses from the generator 74, driving the FIFO 64 output, is nominally selected to correspond to the FIFO 64 input clock frequency from the divider 66. The storage capacity of the receiver FIFO 64 is sufficient to permit the copy paper to be wrapped about the drum 68 to initially synchronize with the incoming data which requires a maximum capacity to accommodate one drum 68 revolution. Thus, should the incoming diphase data arrive at the receiver when the start of the copy paper is nonaligned with the recorder 70, the FIFO 64 will accumulate data until such alignment is reached.

Alternate Embodiment

With reference to the alternate embodiment of FIG. 2, those components having structure and function similar to components previously described in connection with the discussion of the previous embodiment have been designated with the same reference numeral with a subscript a. The transmitter 10a of the embodiment of FIG. 2 includes a direct current motor 84 for driving the document drum 36a and sensor 18a. The speed of the motor 84 is proportional to the voltage applied thereto. The motor is driven by an amplifier 86 which, in turn, is driven by the output of a phase and frequency detector 88. The detector serves to compare the sample pulse rate from the pulse generator 46a with the output of the divider 50a. In this manner, the speed of the motor 84 is maintained at the desired rate which prevents accumulation of data in the FIFO 22a. As will be appreciated, this embodiment substitutes a direct current motor 84 and a phase lock loop control system for the synchronous motor 16 and frequency divider combination of the previous embodiment. Since the operation of the transmitter 10a is similar to the operation of the previously described embodiment, additional discussion will not be provided.

Figure 2:
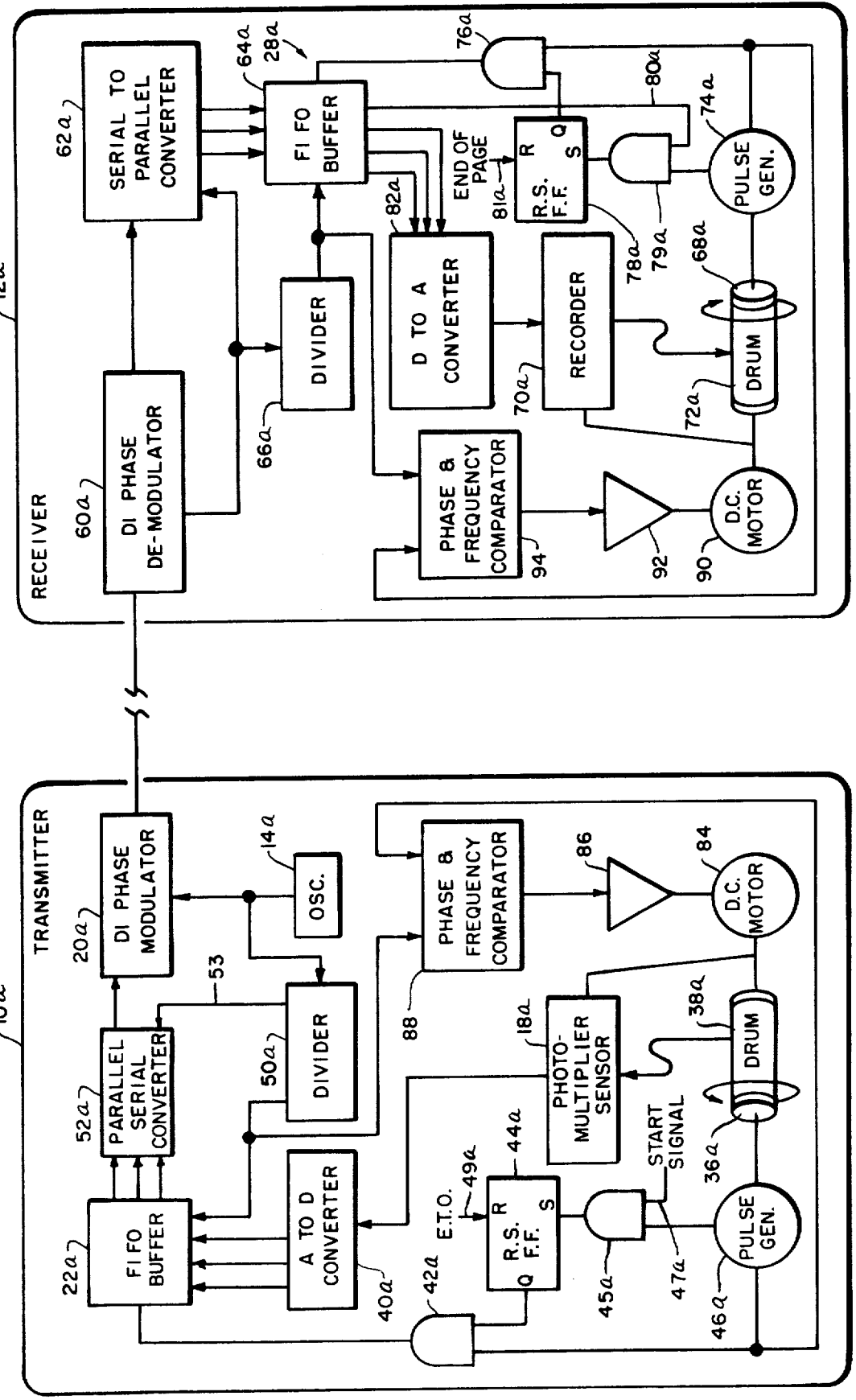
FIG. 2 is a schematic block diagram of an alternate embodiment of a facsimile transmission system including certain features of this invention.

With respect to the receiver section 12a of FIG. 2, a direct current (D.C.) motor 90 drives a drum 68a pulse generator 74a and recorder 70a. The motor 90 is energized by the output of an amplifier 92 which, in turn, is driven by the output of a phase and frequency comparator 94. The comparator 94 serves to compare the sample pulse rate from the generator 74a with the output of the divider 66a feeding the input clock to the FIFO 64a. In this manner, once the data readout from the FIFO 64a starts, additional data will not accumulte therein. The FIFO 64a serves to "smooth" any speed variations introduced by the motor 74a and other mechanical components of the receiver section 12a. Thus, when compared to the previous embodiment, a direct current motor 90 and phase-frequency comparator 94 are substituted for the synchronous motor 65 and divider 67 of the previous embodiment. The operation of the receiver is similar to that of the previous embodiment and will not be further considered.

An apparatus for synchronizing a facsimile transmission has been described. The apparatus serves to synchronize the facsimile receiver with the transmitter initially and during transmission. Although this invention has been shown and described with reference to two embodiments thereof, it will be understood that various changes in form and detail may be made without departing from the spirit and scope of the invention.

What is claimed is:

1. An apparatus for facsimile communications comprising:
   a sensor positioned adjacent a selected document and selectively movable along the document, said sensor generating a signal corresponding to the reflective qualities of sampled, selected areas of the document;
   means for successively storing a series of the signals from said sensor;
   means for reading out said stored signals from said storage means at a predetermined rate whereby the variations in the signal rate from the sensor are substantially eliminated by said storage means thus producing a constant output rate from said storage means;
   a motor for positioning said sensor with respect to the document;
   means for generating a predetermined frequency, serving to determine the speed of the motor, said frequency generating means controlling the readout rate of the storage means so that the sample rate of said sensor is related to the output rate of data from said storage means;
   means, coupled to said motor, for generating a signal corresponding to the relative position of said sensor with respect to the document, said signal generating means being coupled to the storage means and serving to control the rate at which the output from the sensor is fed into the storage means;
   an analog to digital converter receiving the analog output of said sensor and feeding a multilevel digital signal to said storage means;
   a parallel to serial converter receiving the multilevel digital signal from said storage means; and
   a diphase modulator receiving the serial output from said converter and the predetermined signal from said frequency generating means and providing a diphase signal in accordance therewith.

2. The apparatus of claim 1 further comprising:
   a demodulator receiving said diphase signal and extracting both clock and data signals therefrom;
   a variable speed motor coupled to the clock output of said demodulator, so that the speed of said motor is determined by the clock signal from said demodulator; and
   a recorder positionally driven by said motor for recording upon a copy sheet carried by said drum, said recorder receiving said data signal from said demodulator.

3. An apparatus for receiving a diphase facsimile signal comprising:
   a demodulator extracting both clock and data informational signals from the incoming diphase signal;
   a positionable recorder for recording the said data signal upon a cppy sheet and a variable speed motor coupled to said recorder for positioning thereof, the speed of said motor being determined by the clock signal derived from the demodulator;
   means for sequentially storing the data information from said demodulator;
   means for generating a signal related to the relative position of said recorder with respect to the copy sheet, the signal from said generating means serving to control the output rate of said storage means feeding said recorder.

4. The apparatus of claim 3 which further includes a serial to parallel converter receiving said data signal from said demodulator and feeding said storage means with a multi-level digital signal, and a digital to analog converter receiving the multilevel signal from said storage means and supplying said analog signal to said recorder.

5. The apparatus of claim 3 which further includes a synchronous motor for positioning said recorder, the clock signal from said diphase demodulator serving to control the speed of said synchronous motor.

6. The apparatus of claim 3 which further includes a direct current motor for positioning said recorder and a phase-frequency comparator driving said direct current motor for control of the speed thereof, said phase-frequency comparator comparing the output of said signal generating means with a signal related to said clock signals.

* * * * *